US008571176B2

(12) United States Patent
Ikhlef et al.

(10) Patent No.: US 8,571,176 B2
(45) Date of Patent: Oct. 29, 2013

(54) METHODS AND APPARATUS FOR COLLIMATION OF DETECTORS

(75) Inventors: Abdelaziz Ikhlef, Hartland, WI (US); Joseph Lacey, Cambridge, WI (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 13/163,367

(22) Filed: Jun. 17, 2011

(65) Prior Publication Data

US 2012/0321041 A1 Dec. 20, 2012

(51) Int. Cl.
*G01N 23/04* (2006.01)
*G21K 1/02* (2006.01)

(52) U.S. Cl.
USPC ............ 378/62; 378/147

(58) Field of Classification Search
None
See application file for complete search history.

(56) References Cited

U.S. PATENT DOCUMENTS

| | | | | |
|---|---|---|---|---|
| 6,359,958 | B2 | 3/2002 | Toth | |
| 7,031,434 | B1 | 4/2006 | Saunders et al. | |
| 7,266,180 | B1 | 9/2007 | Saunders et al. | |
| 7,436,933 | B2 | 10/2008 | Saunders et al. | |
| 7,492,857 | B2 | 2/2009 | Yasunaga et al. | |
| 7,502,437 | B2 | 3/2009 | Schlomka et al. | |
| 7,609,804 | B2 | 10/2009 | Hoffman | |
| 7,655,915 | B2 | 2/2010 | Ratzmann et al. | |
| 2004/0120464 | A1 | 6/2004 | Hoffman | |
| 2004/0227092 | A1* | 11/2004 | Ratzmann et al. | 250/367 |
| 2007/0064876 | A1* | 3/2007 | Hoffman | 378/147 |

* cited by examiner

*Primary Examiner* — Hoon Song
*Assistant Examiner* — Danielle Fox
(74) *Attorney, Agent, or Firm* — The Small Patent Law Group; Dean D. Small

(57) ABSTRACT

Methods and apparatus for collimation of detectors in an imaging system are provided. One an imaging system includes a radiation source configured to project radiation from a focal spot onto an object and a plurality of radiation detectors disposed around at least a portion of the object. The plurality of radiation detectors detect received radiation along a path projected from the focal spot to the plurality of detectors. The imaging system also includes a plurality of collimators positioned between the object and the plurality of detectors, wherein the collimators have a tapered configuration.

16 Claims, 4 Drawing Sheets

METHODS AND APPARATUS FOR COLLIMATION OF DETECTORS

BACKGROUND OF THE INVENTION

The subject matter disclosed herein relates generally to post-object collimators for detectors (e.g., collimators positioned at detectors that detect x-rays after passing through a patient), and more particularly, to collimators for imaging detectors, such as Computed Topography (CT) scanners.

Multislice image scanners, such as multislice CT scanners, having increased speed and larger coverage areas can provide higher resolution diagnostic images. For example, images with greater anatomic detail or diagnostically relevant information may be provided. For example, different details of interest in diagnosis may be small structures, features, and objects associated with normal anatomy and various pathological conditions. However, one of the limiting factors in the visualization of these small structures and features can be the artifacts introduced by the imaging system. In particular, one such known limiting factor in medical imaging systems that may introduce image artifacts during image reconstruction is focal spot drift, which is also known as focal spot motion.

The focal spot motion may be caused by different factors, such as movement of the gantry system relative to the object being scanned, imaging system calibration errors, air calibration errors, misalignment of the anode or degrading x-ray tube glass, oscillation of the focal spot clue to mechanical vibration, thermal changes, among others. Thus, reducing the focal spot motion results in a reduction in artifacts in reconstructed images, Some conventional imaging system use skewed detector collimators to desensitize the detector to focal spot motion. By skewing the collimator, collimation on each side of a pixel is provided. However, this skewed collimation reduces the light collection because the x-ray aperture is reduced. The skew reduces the geometric efficiency of the detector, but decreases the collimator sensitivity to geometric tolerances and the focal spot motion.

BRIEF DESCRIPTION OF THE INVENTION

In accordance with an embodiment, an imaging system is provided that includes a radiation source configured to project radiation from a focal spot onto an object and a plurality of radiation detectors disposed around at least a portion of the object. The plurality of radiation detectors detect received radiation along a path projected from the focal spot to the plurality of detectors. The imaging system also includes a plurality of collimators positioned between the object and the plurality of detectors, wherein the collimators have a tapered configuration.

In accordance with another embodiment, a method for collimating a radiation detector is provided. The method includes disposing a plurality of radiation detectors to surround at least a portion of an object and providing a plurality of tapered edge collimators between the object and the plurality of detectors, wherein the plurality of tapered edge collimators are configured to increase exposure of the plurality of radiation detectors to a range of focal spot positions. The method also includes configuring the plurality of radiation detectors to measure a transmitted radiation along a path projected from a focal spot to the plurality of radiation detectors through the object.

In accordance with yet another embodiment, a method for manufacturing a collimator for an imaging system is provided. The method includes forming a plurality of collimator elements that define walls for a plurality of channels for the collimator and providing a tapered slope on a first side of the plurality of collimator elements and a tapered slope on a second side of the plurality of collimator elements.

BRIEF DESCRIPTION OF THE DRAWINGS

The drawings illustrate generally, by way of example, but not by way of limitation, various embodiments discussed in the present document.

DETAILED DESCRIPTION OF THE INVENTION

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable one of ordinary skill in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout. In this document, the terms, "a" or "an" are used, as is common in patent documents, to include one or more, than one. In this document, the term "or" is used to refer to a nonexclusive or, unless otherwise indicated.

Figure 1:
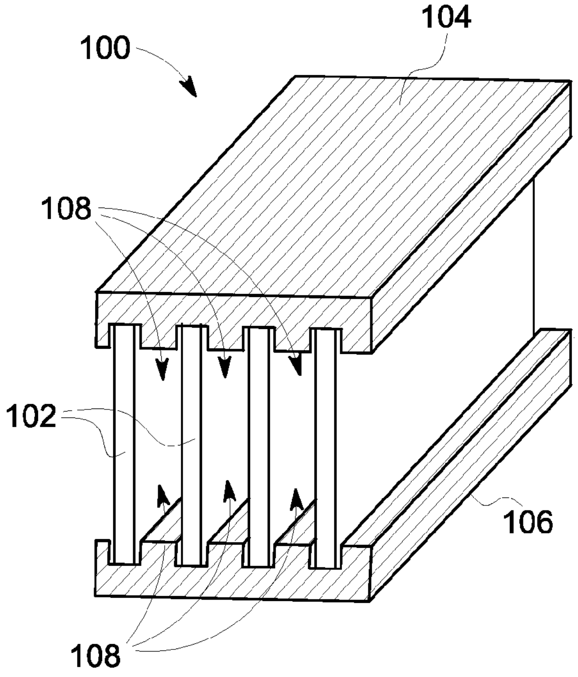
FIG. 1 is a perspective view of a rectangular collimator.

FIG. 1 is a perspective view of a collimator assembly 100 illustrating a frame structure formed from a top support 104 and a bottom support 106, which are illustrated as support members or bases/holders. The top support 104 and the bottom support 106 may be formed from any suitable material, such as carbon or other low Z material for aligning the collimator plates, illustrated as rectangular collimator walls 102. The collimator assembly 100 has a generally rectangular cross-section and includes the plurality of walls 102. The plurality of collimator walls 102 (illustrated as generally parallel plates) are mounted between the top support 104 and the bottom support 106. The top support 104 and the bottom support 106 may be supported, for example, within slots or grooves of the top support 104 and the bottom support 106. The slots or grooves define the alignment of the walls 102. It should be noted that variations are contemplated. For example, removable fixtures or supports may be used to hold the walls 102 that may be glued in place. As another example, the walls 102 may have tabs that align with openings in the fixtures or supports.

The top support 104 and the bottom support 106 are thus configured to support the walls 102 in place to create a plurality of channels 108 between adjacent walls 102. In operation, each collimator channel 108 directs radiation from a radiation source to a detector array 152 (shown in FIG. 2).

Figure 2:
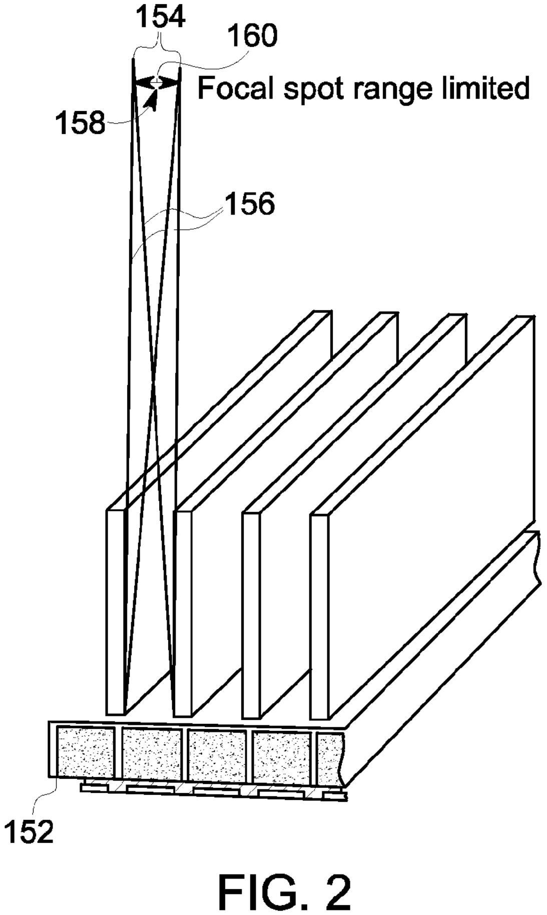
FIG. 2 is a perspective view of the rectangular collimator of FIG. 1 showing a detector assembly.

FIG. 2 is a perspective view of the collimator assembly 100 of FIG. 1 and illustrating a detector assembly, shown as the detector array 152 (e.g., a pixelated imaging detector). FIG. 2 illustrates a focal spot range 158. The detector array 152 includes a plurality of detector elements, each of which measures the intensity of transmitted radiation along a ray path 156 projected from the x-ray source, in particular a focal spot 154 of the x-ray source to a particular element of the detector array 152. In one embodiment, the detector array 152 may be an array of detector elements assembled in a single dimension. In an alternate embodiment, the detector array 152 may be an array of detector elements assembled in two dimensions.

In one embodiment, the focal spot 154, the collimator assembly 100 and the detector array 152 may be mounted on a frame structure. The frame structure may be raised on side supports so as to span around an object (e.g., a patient) being scanned. For example, the framed structure may be a suitable imaging gantry having a bore or central opening therethrough. An object to be scanned is poisoned in the bore.

The focal spot 154, the collimator assembly 100 and the detector array 152 may all rotate. For example, the detector array 152 may detect radiation projections of the object being scanned at different rotation angles. At each gantry angle a projection is acquired by the detector array 152. The gantry is then rotated (which in various embodiments is continuous) to a new gantry angle and another projection is acquired. The process of rotation and acquisition is repeated to acquire the plurality of projections for the respective gantry angles to form a set of projection data. The projection detected by the detector array 152 produce an intensity signal.

It should be noted that as used herein, focal spot generally refers to a region from which radiations are projected or from which the radiations emanate. For example, the focal spot 154 may be a region on an anode of an x-ray tube. The x-ray tube may be used as part of an x-ray imaging systems, including, for example, for projection radiography and/or CT.

The focal spot 154, when viewed along the central radiation beam in a field may be shaped as a square. For example, the size of the focal spot 154 may be 0.6×0.6 $mm^2$. However, in one embodiment, the focal spot 154 on the anode may be rectangular. As the anode is angled, the square view of focal spot 154 when projected back on the anode has an elongated edge. In operation, the size of focal spot 154 influences the spatial resolution of the imaging system. Thus, the smaller the focal spot 154, the higher the spatial resolution. Additionally, geometric sharpness may be affected by motion of the focal spot 154. The geometric sharpness generally depends on the location of the scanned object relative to the focal spot 154 and the detector receiving the projection. Accordingly, the motion of the focal spot 154 may limit the spatial resolution and affect the geometric sharpness of the imaging system by introducing image artifacts in the reconstructed images.

As used herein, a focal spot range 158 generally refers to a sum of a maximum displacement of the focal spot 154 from an original position 160 in either direction in one dimension, such that a ray of radiation projected or emanating from the focal spot 154 can be directly-received by the detector. For example, the focal spot range 158 may be measured as a displacement of focal spot position during system calibration. As shown in FIG. 2, when the collimator assembly 100 with rectangular cross-section is used, the collimator may limit the focal spot range from Which the detector may receive radiations. Hence, the spatial resolution and the geometric sharpness may be increased as the radiation from the moving focal spot is reduced or blocked. In accordance with some embodiments, a collimator with tapered plates or walls is provided. For example, the tapered plates or walls taper towards the focal spot. In one embodiment, a plurality of tapered plates may be formed from laminated plates. The angle formed from the taper defines the range of the focal spot motion. Thus, by practicing various embodiments, detectors may be provided without any skewing.

Figure 3:
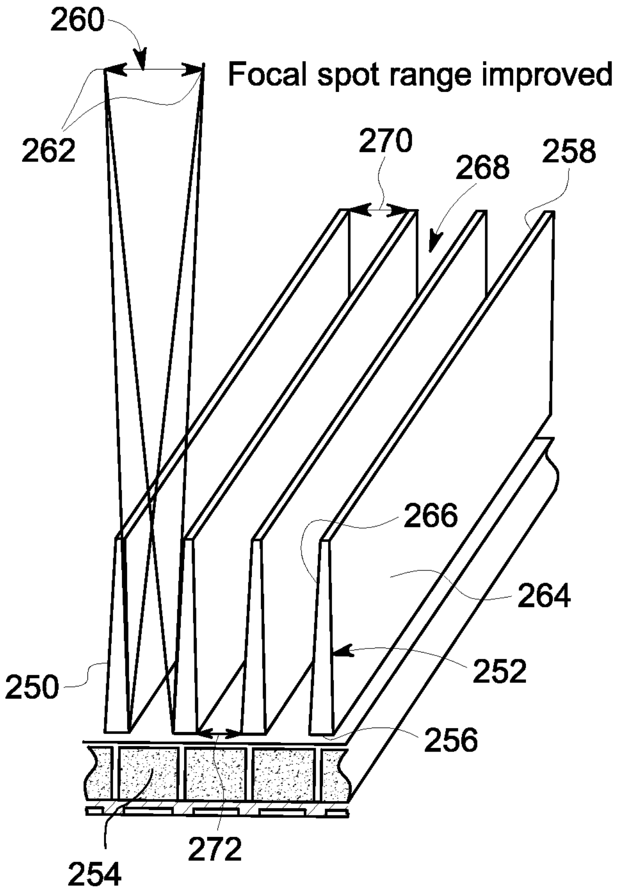
FIG. 3 illustrates a tapered edged collimator formed in accordance with one embodiment.

FIG. 3 illustrates a tapered plate collimator arrangement having tapered collimator plates 250 in accordance with one embodiment. The plates 250 are generally wider at a base 256 (closer to a face of one or more detectors 254) and tapered to a thinner width at a top 258. In the illustrated embodiment, the collimator plates 250 have a tapered slope or angle on a first side 264 and similarly, but oppositely tapered slope or angle on a second side 266 of the collimator plates 250. In one embodiment, the slope on the first side 264 and the slope on the second side 266 may be equal. In an alternate embodiment, the slope on the first side 264 and the slope on the second side 266 may be different. Thus, in various embodiments the collimator plates 250 have a generally trapezoidal cross-section.

Thus, in the illustrated embodiment, the collimator plates 250 are placed (e.g., mounted) above, adjacent or abutting the detectors 254 such that the wider base 256 is closer to the detectors 254 and the thinnest edge at the top 258 of the collimator plates 250 is closer to the focal spot 262. The tapered edged collimator arrangement provides a wider focal spot range 260 for the reception of radiation from the focal spot 262 that impinges on and is detected by the detector 254. Thus, the tapered edged collimator arrangement can reduce or minimize sensitivity to the focal spot motion by providing the focal spot 262 with an increased focal spot range 260. As can be seen, the focal spot range 260 for the arrangement having the tapered collimator plates 250 is larger than the focal spot range 158 for the collimator assembly 100 that has generally rectangular walls 102 as shown in FIG. 2.

In operation, the tapered sides 264 and 266 allow utilization of all four edges at the thicker base 256 of the collimator arrangement. The four base edges block the radiation from reaching the detectors 254. Additionally, the top 258 of the collimator with tapered edge 252 forms a broader aperture opening for the channels 268. The channels 268 have an inlet aperture 270 and an outlet aperture 272, wherein the inlet aperture 270 is wider than the outlet aperture 272 in various embodiments. The inlet aperture 270 and the output aperture 272 may be adjusted, for example, as a function of a focal spot size. Thus, tapered edge 252 can provide lower sensitivity to motion of the focal spot 262 while providing scatter rejection from the scanned object.

In one embodiment, the collimator plates 250 with the tapered edges 252 may be manufactured as a single unitary body, for example, using a casting process. However, the collimator plates 250 may be formed from multiple elements as described below or using different manufacturing processes.

Figure 4:
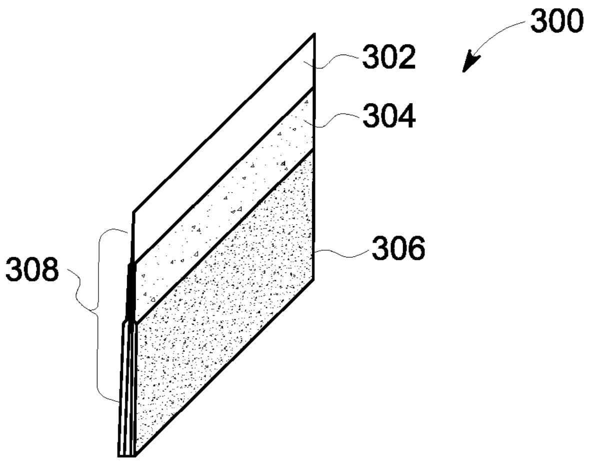
FIG. 4 illustrates collimator plates of a tapered edged collimator formed in accordance with another embodiment.
Figure 5:
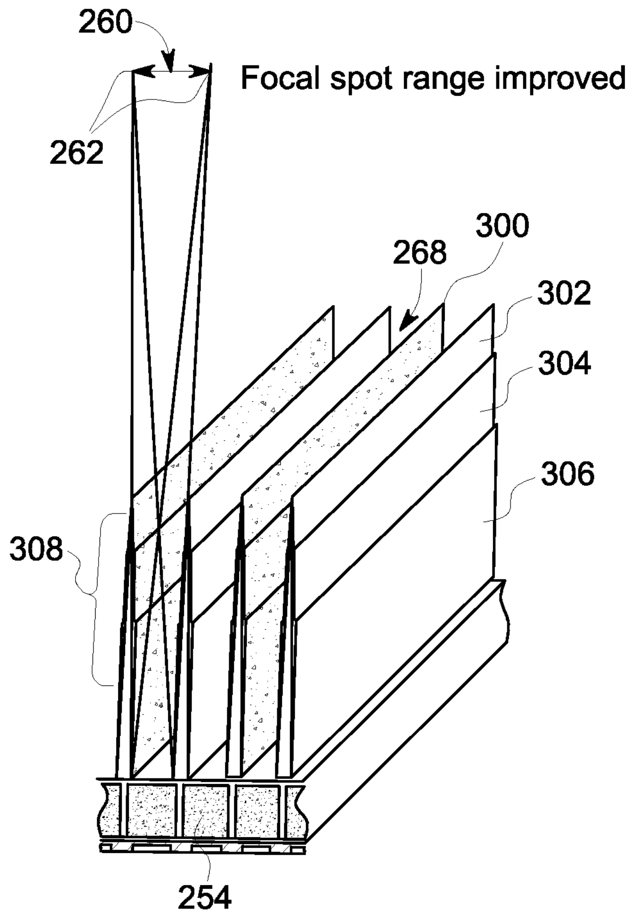
FIG. 5 illustrates a tapered edge collimator in accordance with another embodiment formed using the collimator plates of FIG. 4.

In particular, FIG. 4 illustrates another embodiment of a tapered edge collimator arrangement 300 that may be used to define a wall that is used to provide multi-channel collimation as shown in FIG. 5. The tapered edge collimator arrangement 300 is formed from a plurality of thin plates coupled together to form a stepwise or incremental slope. For example, the tapered edge collimator arrangement 300 is formed from collimator plate 302, a pair of collimator plates 304 and a pair of collimator plates 306. It should be noted that although five collimator plates, additional or fewer plates may be provided.

In one embodiment, the tapered edge collimator arrangement 300 is formed using a plurality of laminated thin collimator plates, which are illustrated as generally planar plates. However, the collimator plates 302, 304 and 306 may also have sloped or tapered edges.

The collimator plates 302, 304 and 306 are arranged such that the tallest collimator plate 302 (i.e., having the greatest length or height) is positioned in the center, between the pair of collimator plates 304, which are shorter than the collimator plate 302. Accordingly, the collimator plates 304 are provided on each side of the collimator plate 302. It should be noted that the different in height between the collimator plates 302, 304 and 306 may be varied as desired or needed. The number of the laminated thin plates depends on, for example, the amount of scatter-to-primary rejection desired and on the range of the focal spot motion.

The pair of collimator plates 306 is positioned on either side of the collimator plates 304, such that the collimator plates 304 are sandwiched between the collimator plate 302 and the collimator plates 306. The collimator plates 306 are shorter than collimator plates 302 and 304. Additional collimator plates may be provided to further define the slope.

The collimator plates 302, 304 and 306 may be coupled together using any suitable adhesive, such as glue or epoxy. Thus, in one embodiment, the collimator plates 302, 304 and 306 are separately formed then coupled together. In other embodiments, the collimator plates 302, 304 and 306 may be formed in a single cast process. The collimator plates 302, 304 and 306 may have the same or different thicknesses, or may be formed from different material. For example, in one embodiment, the collimator plates 302, 304 and 306 are each 40 μm plates stacked and coupled together, such as the five plate illustrated, to form a 200 μm collimator arrangement. Optionally, the collimator plates may be laminated. It should be noted that although five collimator plates are shown, the number of collimator plates used to form the tapered collimator may be more or less than five plates. For example, the number of collimator plates used to form one tapered collimator may be determined based on the amount of radiation scatter received by the detectors (e.g., based on a scatter to primary ratio). As another example, the number of collimator plates used to form one tapered collimator may be determined based on the focal spot motion.

It should be noted that different manufacturing processes may be used to form the collimator plates 302, 304 and 306. For example, the collimator plates 302, 304 and 306 may be formed using a sintering process or as cast plates (e.g., epoxy+W, lead, epoxy+high Z filler). As another example, the collimator plates 302, 304 and 306 may be formed as selectively chemically etched plates.

Thus, the stepwise arrangement defines an angle created by the tapered edge 308 that defines the range of the focal spot motion tolerance, which can allow for a relaxation of the specification of the focal spot motion of the x-ray tube. The change in the height of the collimator plates 302, 304 and 306 define a tilt angle for the collimation.

FIG. 5 illustrates the tapered edge collimator arrangement 300, wherein a plurality of stepwise elements is aligned to define a plurality of channels similar to FIG. 3. It should be noted that the stepwise elements may be maintained in position also as described above in connection with FIG. 3.

It should be noted that in addition to reducing motion of the focal spot 202 in the x-axis, an imaging system with the tapered edge collimator embodiments can reduce artifacts introduced as a result of collimator tilt and bow.

Figure 6:
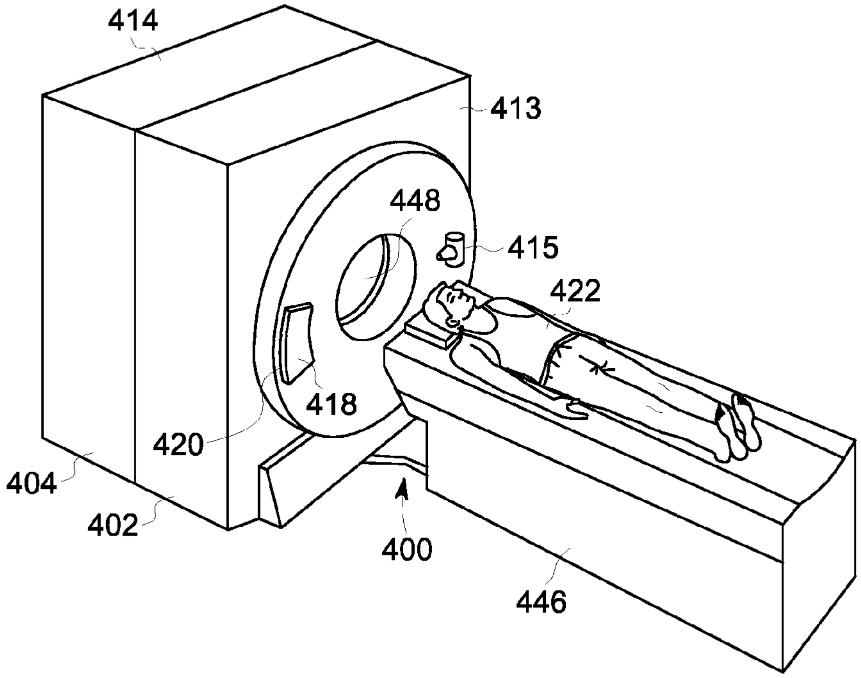
FIG. 6 is a perspective view of an imaging system that may include a collimator formed in accordance with various embodiments.
Figure 7:
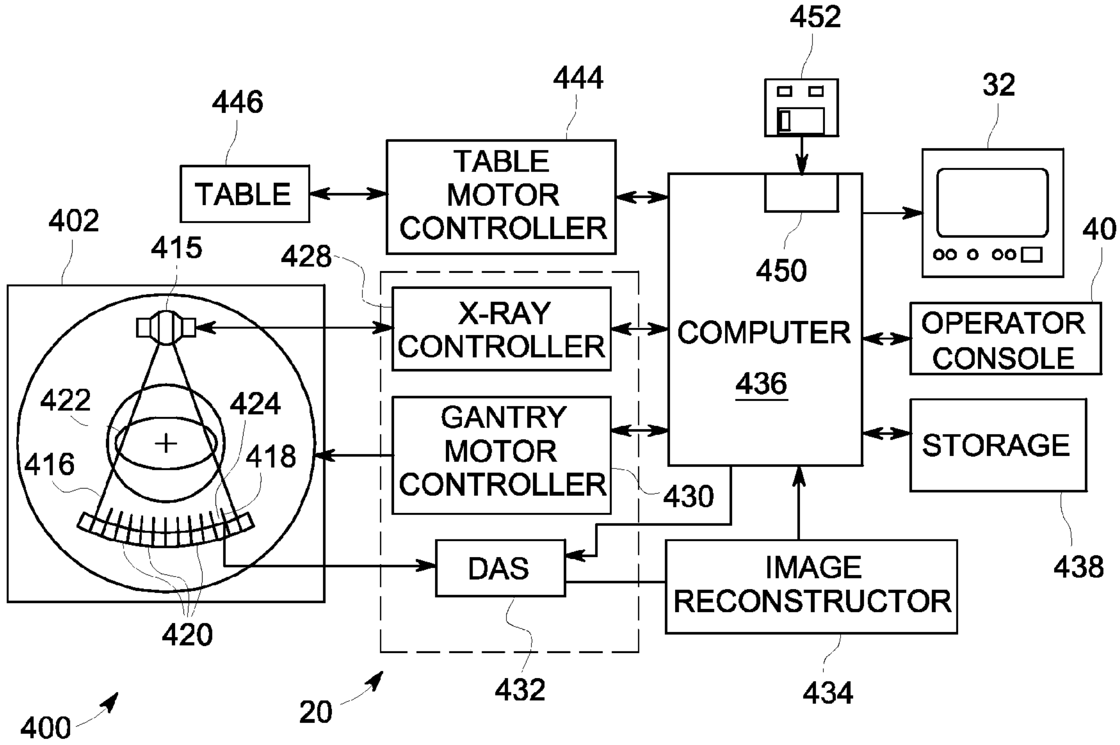
FIG. 7 is a schematic block diagram of the imaging system shown in FIG. 6.

FIG. 6 is a perspective view of an exemplary imaging system 400 in which the various collimator arrangement may be implemented. FIG. 7 is a schematic block diagram of the imaging system 400 (shown in FIG. 6). In the exemplary embodiment, the imaging system 400 is a multi-modal imaging system and includes a first modality unit 402 and a second modality unit 404. The modality units 402 and 404 enable system 400 to scan an object, for example, the subject 422. (e.g., patient), in a first modality using the first modality unit 402 and to scan the subject 422 in second modality using the second modality unit 404. The system 400 allows for multiple scans in different modalities to facilitate an increased diagnostic capability over single modality systems.

In one embodiment, the multi-modal imaging system 400 is a Computed Tomography/Positron Emission Tomography (CT/PET) imaging system 400. CT/PET system 400 includes a first gantry 413 associated with the first modality unit 402 and a second gantry 414 associated with the second modality unit 404. In other embodiments, modalities other than CT and PET may be employed with imaging system 400. The gantry 413 includes the first modality unit 402 that has an x-ray source 415 that projects a beam of x-rays 416 toward a plurality of detector elements 420 on the opposite side of the gantry 413.

In one embodiment, the multi-modal imaging system 400 comprises a plurality of collimators 418 positioned between the subject 422 and the plurality of detector elements 420, wherein the collimators 418 having a tapered configuration as described herein. The tapered collimators 418 may be used to collimate x-ray radiation from x-ray tube.

In an alternate embodiment, the collimators 418 may comprise x-ray absorbing material. The collimators 418 are assembled so that the adjacent collimators 418 form channels 424 therein for restricting background radiation from reaching the detectors. The channels 424 have an inlet aperture and an outlet aperture, wherein the inlet aperture is wider than the outlet aperture. The channel inlet aperture and the channel output aperture are adjustable as a function of a focal spot size of the x-ray source.

In one embodiment, the multi-modal imaging system 400 comprises the tapered collimators 418, with the tapered collimators 418 having a first slope on a first side and a second slope on a second side. The first slope has a first inclination angle and the second slope has a second inclination angle. The first inclination angle and the second inclination angle may be the same or different as described herein.

The detector elements 420 are be formed by a plurality of detector rows (not shown) that together sense the projected x-rays that pass through an object, such as the subject 422. Each detector element 420 produces an electrical signal that represents the intensity of an impinging x-ray beam and therefore, allows estimation of the attenuation of the beam as the beam passes through the subject 422.

During a scan, to acquire x-ray projection data, the gantry 413 and the components mounted thereon rotate about an examination axis 426. FIG. 7 shows only a single row of detector elements 420 (i.e., a detector row). However, a detector array may be configured as a multislice detector array having a plurality of parallel rows of detector elements 420 such that projection data corresponding to a plurality of slices can be acquired simultaneously during a scan.

The rotation of the gantry 413, and the operation of x-ray source 415, are controlled by the system controller 423 of the CT/PET system 400. The system controller 423 includes an x-ray controller 428 that provides power and timing signals to the x-ray source 415 and a gantry motor controller 430 that controls the rotational speed and position of the gantry 413. A data acquisition system (DAS) 432 of the system controller 423 samples data from detector elements 420 for subsequent processing as described above. An image reconstructor 434 receives sampled and digitized x-ray projection data from the DAS 432 and performs high-speed image reconstruction. The reconstructed image is transmitted as an input to a computer 436 which stores the image in a storage device 438. The computer 436 may be programmed to implement various embodiments described herein. More specifically, the computer 436 may include an image reconstructor 434 that is programmed to carry out the various methods described herein.

The computer 436 also receives commands and scanning parameters from an operator via an operator workstation 440 that has an input device, such as, keyboard. The associated display 442 allows the operator to observe the reconstructed image and other data from the computer 436. The operator supplied commands and parameters are used by computer 436 to provide control signals and information to the DAS 432, the system controller 423, and the gantry motor controller 430. In addition, the computer 436 operates a table motor controller 444 which controls a motorized table 446 to position the subject 424 in the gantry 413 and 414. Specifically, the table 446 moves portions of the subject 24 through a gantry opening 448.

In one embodiment, the computer 436 includes a read/write device 450, for example, a floppy disk drive, CD-ROM drive, DVD drive, magnetic optical disk (MOD) device, or any other digital device including a network connecting device such as an Ethernet device for reading instructions and/or data from a non-transitory computer-readable medium 452, such as a floppy disk, a CD-ROM, a DVD or an other digital source such as a network or the Internet, as well as yet to be developed digital means. In another embodiment, the computer 436 executes instructions stored in firmware (not shown). The computer 436 is programmed to perform functions as described herein, and as used herein, the term computer is not limited to integrated circuits referred to in the art as computers, but broadly refers to computers, processors, microcontrollers, microcomputers, programmable logic controllers, application specific integrated circuits, and other programmable circuits, and these terms are used interchangeably herein. CT/PET system 400 also includes a plurality of PET detectors (not shown) including a plurality of detector elements.

Various embodiments described herein provide a tangible and non-transitory machine-readable medium or media having instructions recorded thereon for a processor or computer to operate, an imaging apparatus to perform an embodiment of a method described herein. The medium or media may be any type of CD-ROM, DVD, floppy disk, hard disk, optical disk, flash RAM drive, or other type of computer-readable medium or a combination thereof.

The various embodiments and/or components, for example, the monitor or display, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the, following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An imaging system comprising:

a radiation source configured to project radiation from a focal spot onto an object;

a plurality of radiation detectors disposed around at least a portion of the object, wherein the plurality of radiation detectors detect received radiation along a path projected from the focal spot to the plurality of detectors; and a plurality of collimators positioned between the object and the plurality of detectors, wherein the collimators have a tapered configuration, the plurality of collimators comprising laminated collimator plates extending along a height of the plurality of collimators, each laminated collimator plate arranged with a tallest plate interposed between shorter plates across a width of the laminated collimator plate.

2. The imaging system of claim 1, wherein the collimators have a base proximate to the plurality of radiation detectors and a top proximate the object, wherein the base is wider than the top.

3. The imaging system of claim 1, wherein the plurality of collimators are formed from single tapered plates having a constant slope.

4. The imaging system of claim 1, wherein the laminated collimator plates are arranged with one plate laminated between a pair of shorter plates that are laminated between a pair of shorter plates.

5. The imaging system of claim 1, wherein the radiation source projects electromagnetic waves.

6. The imaging system of claim 1, wherein the plurality of collimators comprise x-ray absorbing material and adjacent collimators form a channel therein for restricting scatter radiation from reaching the plurality of radiation detectors, the channel having an inlet aperture and an outlet aperture, wherein the inlet aperture is wider than the outlet aperture.

7. The imaging system of claim 6, wherein the channel inlet aperture and the channel output aperture are defined as a function of a focal spot size and motion of the radiation source.

8. The imaging system of claim 1, wherein the plurality of collimators have a first slope on a first side and a second slope on a second side, the first slope having a first inclination angle, the second slope having a second inclination angle, with the first inclination angle and the second inclination angle being equal.

9. The imaging system of claim 1, wherein the plurality of collimators have a first slope on a first side and a second slope on a second side, the first slope having a first inclination angle, the second slope having a second inclination angle, with the first inclination angle and the second inclination angle being unequal.

10. A method for collimating a radiation detector, the method comprising:

disposing a plurality of radiation detectors to surround at least a portion of an object;

providing a plurality of tapered edge collimators between the object and the plurality of detectors, wherein the plurality of tapered edge collimators are configured to increase exposure of the plurality of radiation detectors to a range of focal spot positions, the plurality of tapered edge collimators comprising laminated collimator plates extending along a height of the plurality of tapered edge collimators, each laminated collimator plate arranged with a tallest plate interposed between shorter plates across a width of the laminated collimator plate; and configuring the plurality of radiation detectors to measure a transmitted radiation along a path projected from a focal spot to the plurality of radiation detectors through the object.

11. The method of claim 10, wherein the plurality of tapered edge collimators have a base proximate to the plurality of radiation detectors and a top proximate the object, wherein the base is wider than the top.

12. The method of claim 10, wherein the plurality of tapered edge collimators comprise x-ray absorbing material and adjacent collimators form a channel therein for restricting scatter radiation from reaching the plurality of radiation detectors, the channel having an inlet aperture and an outlet aperture, wherein the inlet aperture is wider than the outlet aperture.

13. The method of claim 12, wherein the channel inlet aperture and the channel output aperture are defined as a function of a focal spot size and motion range of the x-ray source.

14. A method for manufacturing a collimator for an imaging system, the method comprising:

forming a plurality of collimator elements that define walls for a plurality of channels for the collimator; and providing a tapered slope on a first side of the plurality of collimator elements and a tapered slope on a second side of the plurality of collimator elements, the plurality of collimator elements comprising laminated collimator plates extending along a height of the plurality of collimator elements, each laminated collimator plate arranged with a tallest plate interposed between shorter plates across a width of the laminated collimator plate.

15. The method of claim 14, wherein the slope of the first side and the slope of the second side are equal.

16. The method of claim 14, wherein the slope of the first side and the slope of the second side are unequal.

* * * * *